United States Patent [19]
Howell

[11] Patent Number: 5,275,199
[45] Date of Patent: Jan. 4, 1994

[54] ADJUSTABLE SURFACE MOUNT PLUMBING ADAPTER

[76] Inventor: Dan R. Howell, 2606 Glenwood Rd., Florence, S.C. 29505

[21] Appl. No.: 60,744

[22] Filed: May 12, 1993

[51] Int. Cl.⁵ .................................................. F16L 5/00
[52] U.S. Cl. ..................................... 137/360; 285/158
[58] Field of Search ................... 137/360, 359; 285/158

[56] References Cited

U.S. PATENT DOCUMENTS

| | | | |
|---|---|---|---|
| 3,548,079 | 12/1970 | Jones et al. | 285/158 X |
| 4,071,267 | 1/1978 | Davis | 285/158 X |
| 4,463,460 | 8/1984 | Arnold et al. | 137/360 X |
| 4,650,223 | 3/1987 | Miyazaki et al. | 285/158 |
| 5,029,607 | 7/1991 | Blazek et al. | 137/360 |

Primary Examiner—Martin P. Schwadron
Assistant Examiner—Kevin L. Lee
Attorney, Agent, or Firm—Dority & Manning

[57] ABSTRACT

The present invention relates to an adjustable surface mount plumbing adapter providing a rigid through-wall plumbing connection. The adapter includes an inner wall mount having a threaded stem portion for engagement with an outer wall mount. The stem portion defines a path through the wall with the wall being squeezed between the inner and outer mounts. Any manner of plumbing connections, pipes, fixtures, etc. can be connected to either the inner or outer mounts.

13 Claims, 2 Drawing Sheets

ADJUSTABLE SURFACE MOUNT PLUMBING ADAPTER

BACKGROUND OF THE INVENTION

The present invention relates to a plumbing fixture or adapter, and more particularly to an adjustable through-wall adapter for providing a rigid passage for plumbing pipes or fixtures through the wall.

The common practice in the plumbing industry for penetrating or running pipes or lines through a wall is to simply drill a hole in the wall during fabrication of the structure and then run the line or pipe through the hole. Decorative mounts may be placed on the outer wall side, but these mounts are merely to hide the hole in the wall and serve no function. The solid integral pipe extending through the wall may be connected to a plumbing fixture, such as an isolation valve or faucet on the outer side of the wall, and to a supply line or junction on the inner side of the wall. However, the pipe extending through the wall is not supported against movement or vibration of the wall or structure.

The major drawback of the conventional through-wall system is that the plumbing system is usually incorporated into the construction or fabrication stage of the building or structure. The plumbing system is not separated from one side of the wall to the other and, in essence, is an integral system through the wall. However, when repairs or replacements are needed in the plumbing system, it is often necessary to work on the plumbing on both sides of the wall which entails destroying a substantial portion of the wall to expose the plumbing on either side thereof. This results in significant expense and labor to make what, in essence, is a relatively simple plumbing repair.

OBJECTS AND SUMMARY OF THE INVENTION

It is therefore a principle object of the present invention to provide a surface mount plumbing apparatus that provides a rigid through-wall plumbing connection which essentially separates the plumbing on either side of the wall.

It is also a further object of the present invention to provide a plumbing adapter for through-wall penetration for securely mounting plumbing systems to a wall while allowing for easy repair and replacement of the plumbing fixtures.

Still a further object of this invention is to provide an adjustable surface mount adapter for mounting plumbing fixtures, particularly shower heads, faucets, and the like, to a wall for added support thereby.

Yet a further object of the present invention is to provide an apparatus which allows for easy repair and replacement of plumbing systems and fixtures causing relatively insignificant destruction of the wall through which the plumbing extends.

Additional objects and advantages of the invention will be set forth in part in the description which follows, and in part will be obvious from the description, or may be learned by practice of the invention.

The objects of the invention are attained in that a surface mount plumbing apparatus providing a rigid mounting through walls for plumbing systems is provided. The apparatus is particularly suited for plastic plumbing systems, such as PVC and CPVC. The apparatus includes an inner wall mount that has an inner wall contacting surface and a stem portion of sufficient length to extend through a wall of predetermined thickness. The stem portion has a form-locking outer diameter surface over at least a portion thereof, such as a threaded surface. The stem portion also defines an inner diameter sufficient for a pipe of predetermined diameter to be inserted therein, such as a supply pipe or the like.

The apparatus further includes an outer wall mount which also has an outer wall contacting surface and a receiving portion having a form-locking inner diameter for variable engagement with the stem portion form-locking outer diameter. In a preferred embodiment, the form-locking inner diameter and stem portion outer diameter are threaded connections. The outer wall mount also defines an inner diameter sufficient for a pipe of predetermined diameter to be inserted therein, such as a plumbing fixture, fittings, adapters, or the like. In this manner, the inner wall mount and the outer wall mount define a rigid separable plumbing passage through a wall to which can be glued any manner of plumbing fixtures and pipes. The inner wall mount and outer wall mount are secured to the wall by engagement of the stem portion with the receiving portion of the outer wall mount so that the wall contacting surfaces of the inner mount and outer mount press against both sides of the wall.

The stem portion of the inner wall mount can comprise any length and the form-locking outer diameter surface need not extend over the entire length thereof but, need only be of sufficient length to engage the receiving portion of the outer wall mount. In a preferred embodiment, the threaded stem portion can be cut and a pipe of any desired length inserted between the inner and outer wall mounts.

In a preferred embodiment, the outer wall mount further includes a circumferential engagement portion so that the wall mount can be tightened onto the stem portion, such as a hexagonal shaped circumference for engagement by a wrench or like device. Alternatively, the outer wall mount could be simply hand tightened onto the stem portion.

In an alternative preferred embodiment, the stem portion inner diameter and receiving portion inner diameter may also include flanges, collars, or like components for abutment or engagement with a plumbing pipe or fixture to be inserted therein. In this embodiment, it is not necessary that the supply pipe extending into the inner wall mount and the pipe or fixture extending from the outer wall mount be of the same diameter. For example, a three quarter inch supply line may be inserted into the inner wall mount whereas a half inch line may extend from the outer wall mount, with an appropriate sized adapter fitted within the outer wall mount providing for the diameter difference.

The accompanying drawings constitute a part of the specification and illustrate embodiments of the invention and, together with the description, serve to explain principles of the invention. Elements of one embodiment of the figures are interchangeable in other embodiments in the figures, as are elements having like designations, so long as the combination of elements is covered by the appended claims.

DESCRIPTION OF THE PREFERRED EMBODIMENTS

Reference will now be made in detail to the presently preferred embodiments of the invention. Each example is provided by way of explanation of the invention, not limitation of the invention. It will be apparent to those skilled in the art that various modifications and variations can be made in the invention without departing from the scope or spirit of the invention. It is intended that the present invention cover such modifications and variations as come within the scope of the claims and their equivalents.

Figure 1:
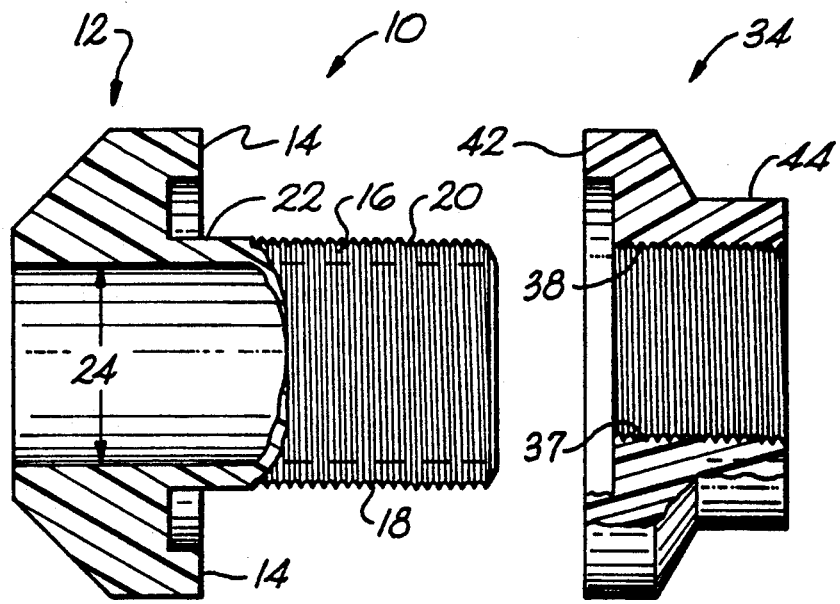
FIG. 1 is a perspective component view shown in partial cut-away of the surface mount plumbing apparatus of the present invention.

In accordance with the objects of the invention, and as illustrated in FIG. 1, an adjustable surface mount adapter 10 is provided. Adapter 10 includes an inner wall mount 12 for being disposed on one side of the wall. Inner wall mount 12 includes wall contacting surface 14. The shape and configuration of inner wall mount 12 and wall contacting surface 14 illustrated in FIG. 1 is illustrated as a mere example of an embodiment of the invention. It should be understood that inner wall mount 12 can take on any shape such as hexagonal, square, or the like. In addition, wall contacting surface 14 may take on the form of an annular ring as illustrated in FIG. 1 or, can assume any other suitable configuration such as alternate projections, a flat surface encompassing substantially the entire back surface of wall mount 12, or the like. In addition, it is within the scope of the claims to include a washer, gasket, or insulation material between inner wall mount 12 and a wall with the washer, gasket, or material thus being the wall contacting surface 14.

Inner wall mount 12 also includes a stem portion 16. Stem portion 16 is of a sufficient length to extend through a wall of predetermined thickness, for example for the adapter to be utilized for walls having a thickness of from ¼ inch to 1½ inches, stem portion 16 could be of a length of 2¼ inches from the wall contacting surface 14. It should be understood that stem portion 16 can be of any length depending upon the thickness of the wall adapter 10 is to be utilized with.

Stem portion 16 also includes a form locking outer diameter surface 18 over at least a portion thereof. In a preferred embodiment as illustrated in the figures, form locking surface 18 comprises a threaded surface 20. However, it is within the scope of the invention that form locking surface 18 also include a ratcheted surface, a tongue in groove surface, or even a smooth surface to be cemented or glued. For ease of manufacture and assembly of adapter 10, however, a threaded surface is preferred.

Inner wall mount 12 further defines an inner diameter 24 sufficient for a pipe of predetermined diameter to be inserted therein. For example, if inner wall mount 12 were to receive a ¾ inch pipe, inner diameter 24 would be approximately 0.882 inches. It should be understood that stem portion 16 is essentially hollow and preferably is of the same inner diameter as inner diameter 24 in the mount 12 receiving the pipe. However, such is not a limitation of the invention. For example, in an alternative preferred embodiment, inner wall mount 12 may include a flange or similar structure essentially separating inner diameter portion 24 and stem portion 16 of the mount 12. In this manner, a pipe inserted into inner diameter 24 would abut against flange 26 and it would not be essential that the inner diameter of stem portion 16 match that of portion 24. A flange or like structure would also provide for easier alignment and gluing or securing of a pipe within mount 12.

Surface mount adapter 10 also includes an outer wall mount 34 as illustrated in the figures. Outer wall mount 34 also includes a wall contacting surface 42 and, as discussed above, the shape and configuration of mount 34 and wall contacting surface 42 illustrated in the figures is but a mere example of any suitable configuration. For example, mount 34 may have a hexagonal, circular, or any other profile. Outer wall mount 34 includes a receiving portion 37. Receiving portion 37 has a form-locking inner diameter surface 38 for engagement with form-locking surface 18 of stem portion 16. In the preferred embodiment, form-locking surface 38 is a threaded surface matching the threads on stem portion 16. In this manner, outer wall mount 34 engages inner wall mount 12 by simply being screwed onto stem portion 16. In this way, a wall is more or less squeezed between wall contacting surfaces 14 and 42 of mounts 12 and 34 respectively. Thus, adapter 10 is non-movably secured directly to the wall and forms a rigid passage therethrough.

Figure 3:
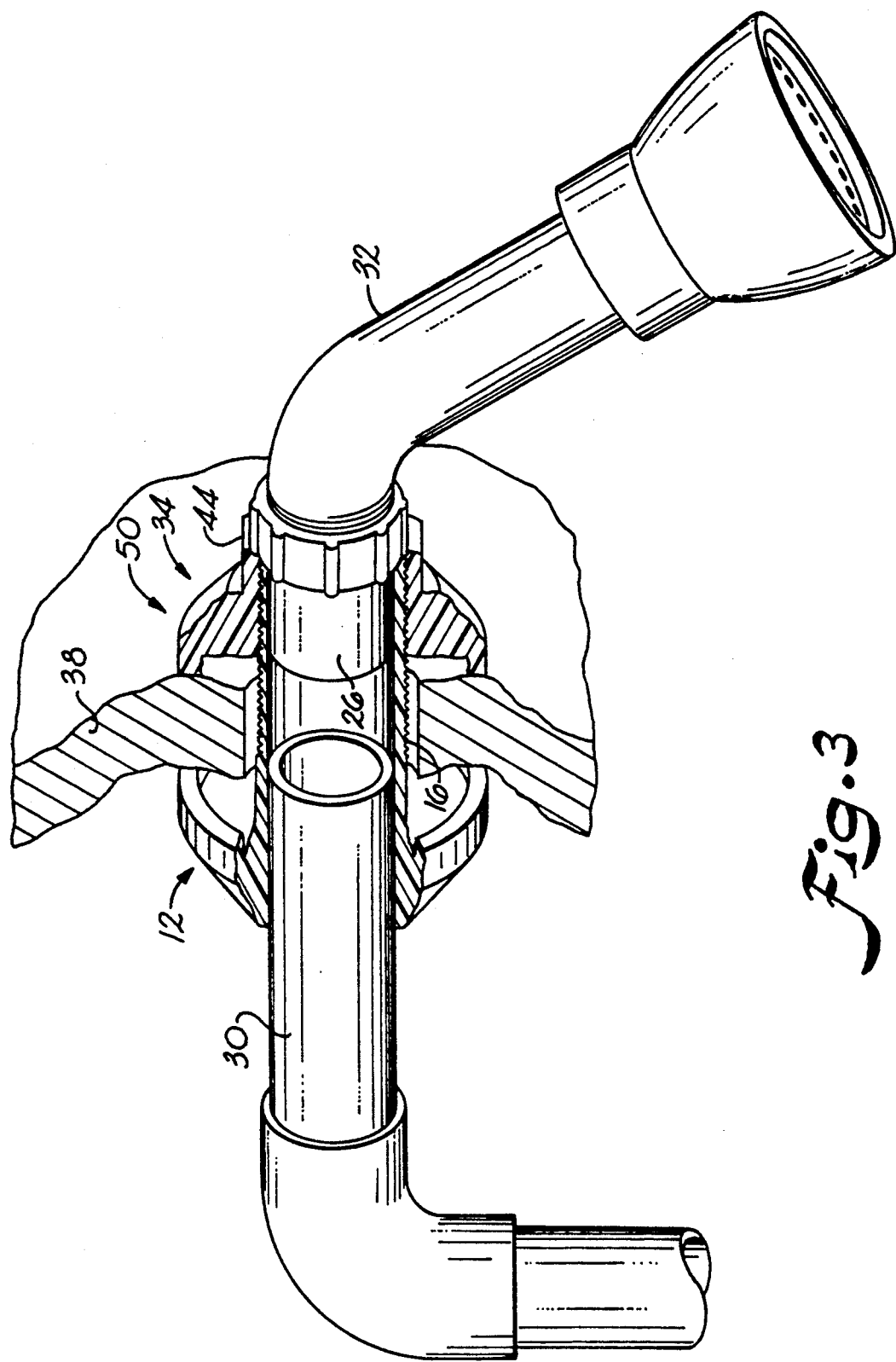
FIG. 3 is a perspective component view of a plumbing system with a rigid through-wall connection according to the present invention.

Outer wall mount 34 acts essentially as a nut which is threaded onto stem portion 1b. In this manner, once mount 34 has been secured to inner mount 12 through stem portion 16, any manner of pipe, fixture, adapter, or the like can be fitted into the open end of stem portion 16 extending through the wall. In a preferred embodiment, as illustrated in FIG. 3, a threaded adapter may be fitted into stem portion 16 for receiving a pipe, fixture, or the like having a diameter different from that of stem portion 16. Also, stem portion 16 may have an inner flange or collar reducing the extreme end diameter thereof.

It is preferred that outer wall mount 34 also include a circumferential engagement portion 44. Preferably, portion 44 is formed in the shape of a hexagon or other flat sided configuration for engagement with a wrench so as mount 34 can be easily screwed or tightened onto inner mount 12. Alternatively, outer mount 34 may be simply hand tightened onto inner mount 12.

The components of the present invention preferably are formed of, and compatible with, conventional plastic plumbing materials, such as PVC and CPVC since these materials can be readily glued. Other materials require welding or soldering and detract from the invention.

Figure 2:
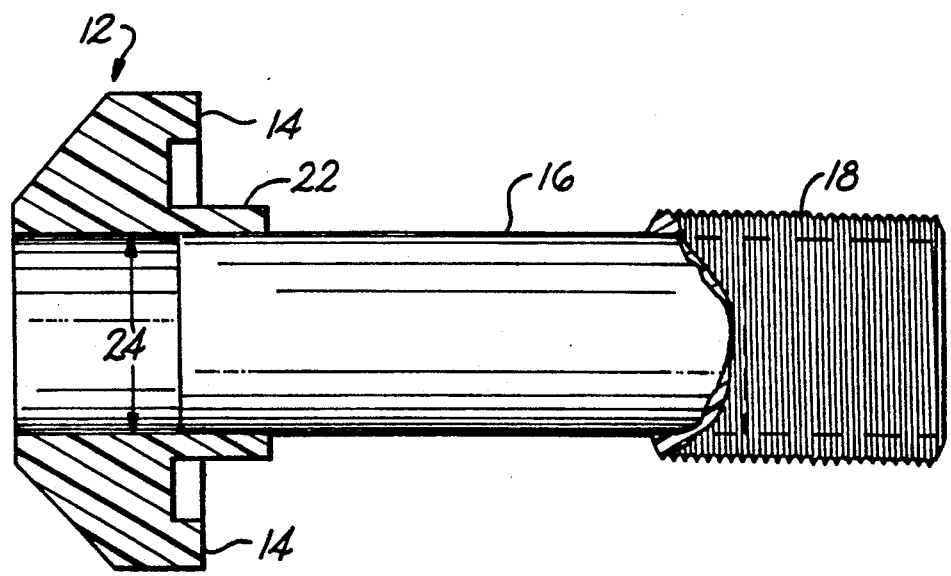
FIG. 2 is a perspective view of an alternative embodiment of the inner wall mount according to the invention.

FIG. 2 illustrates another embodiment of inner wall mount 12 and stem portion 16 according to the invention. Inner wall mount 12 depicted in FIG. 2 would be used for a relatively thick wall and includes a non form-locking or non-engaging portion 22 for extension through the wall. In this embodiment, only form-locking surface 18 would be engaged by outer wall mount 34. Preferably, the stem portion of mount 20 is cut and a pipe of any desired length is inserted between the mount and threaded stem portion. Alternatively, the non form-locking portion and threaded portion could comprise a single integral component. Thus, it should be understood that the present invention is not limited to any particularly thickness of wall and can be suitably adapted for any type wall.

In further accordance with the objects of the present invention, and as depicted in FIG. 3, a plumbing system having a rigid through-wall connection is provided. Plumbing system 50 illustrated in FIG. 3 is but a mere example of a system within the scope of the present invention and is illustrated as a supply 30 and faucet or shower head 32 running through wall 28. It should be understood however that fixture 32 may also be a drain and pipe 30 may also be a drain line instead of a supply header. The present plumbing system is not limited to any particular configuration but is applicable to any through-wall plumbing connection.

In the embodiment of FIG. 3, system 50 includes supply pipe 30 disposed on the inner side of wall 28. Inner wall mount 12 is also provided on the inner side of wall 28 and receives pipe 30 therein. Inner wall mount 12 is essentially as discussed above and includes stem portion 16 extending through wall 28 having a threaded outer surface. On the outer side of wall 28, outer wall mount 34 is provided having a threaded receiving portion for engagement with stem portion 16. Mount 34 has a flat sided circumferential portion 44 for allowing mount 34 to be threaded onto stem portion 16, as discussed above. System 50 further includes plumbing fixture 32 being received in outer wall mount 34. Preferably, an adapter 26 is provided so that fixture 32 is readily removable from outer wall mount 34. Pipe 30 and adapter 26 are easily inserted and glued to mount 12 and stem portion 16, respectively. Also, it is within the scope of the present invention that inner diameter 24 of stem portion 16 be threaded near the end thereof for engagement with a threaded adapter of pipe. However, in the preferred embodiment of the system wherein the components are made of PVC or CPVC material, it is a relatively easy procedure to simply glue fixtures 30 and 32 into the respective mounts 12 and 16.

Fixture 32 of the present system 50 can comprise, for example, a shower head, faucet, drain, isolation valve, or any conventional plumbing fixture.

What is claimed is:

1. A plastic surface mount plumbing adapter providing a rigid mounting through walls for plumbing systems, said adapter comprising:
   an inner wall mount, said inner wall mount further comprising an inner wall contacting surface and a stem portion having a sufficient length to extend through a wall of predetermined thickness, said stem portion having a form locking outer diameter surface over at least a portion thereof, said inner wall mount defining an inner diameter sufficient for a pipe of predetermined diameter to be glued therein; and
   an outer wall mount, said outer wall mount further comprising an outer wall contacting surface and a receiving portion, said receiving portion comprising a form locking inner diameter for variable engagement with said stem a portion form locking outer diameter, said stem portion extending substantially through said outer wall mount so that a pipe of predetermined diameter can be inserted therein; whereby
   said inner wall mount and said outer wall mount defining a rigid plumbing passage through a wall to which can be connected any manner of plumbing fixtures and pipes.

2. The adapter as in claim 1, wherein said stem portion comprises a first non-form locking portion followed by said form locking outer diameter surface.

3. The adapter as in claim 1, wherein said stem portion form locking outer diameter surface comprises a threaded surface and said outer wall mount form locking inner diameter comprises a matching threaded surface.

4. The adapter as in claim 1, wherein said outer wall mount further comprises a circumferential engagement portion so that said outer wall mount can be tightened onto said stem portion.

5. The adapter as in claim 1, wherein said adapter is formed of CPVC material.

6. The adapter as in claim 1, wherein said stem portion inner diameter and said inner wall mount further comprise flanges for engagement with a plumbing pipe or fixture to be inserted therein.

7. The adapter as in claim 1, further comprising an adapter fitting inserted into said stem portion.

8. A plumbing system having a rigid through wall connection, comprising:
   a pipe for disposing at the inner side of the wall;
   an inner wall mount having an inner diameter for receiving said pipe, and an inner wall contacting surface;
   a substantially hollow threaded stem portion formed integral with said inner wall mount for extending from said inner wall mount through the wall;
   an outer wall mount having a threaded receiving portion for threaded engagement with said stem portion, and an outer wall contacting surface, said stem portion extending from said inner wall mount through said outer wall mount; and
   a plumbing fixture having a pipe portion fitted into said stem portion so that a fluid path is defined from said supply pipe, through said inner wall mount and said stem portion, through said outer wall mount, and into said plumbing fixture.

9. The system as in claim 8, wherein said supply pipe, said inner wall mount and stem portion, and said outer wall mount are formed of CPVC material.

10. The system as in claim 8, wherein said plumbing fixture is a shower head.

11. The system as in claim 8, wherein said plumbing fixture is a plumbing isolation valve.

12. The system as in claim 8, wherein said plumbing fixture is a supply line to a faucet.

13. The system as in claim 8, wherein said system is formed of PVC material.

* * * * *